Figure 1:
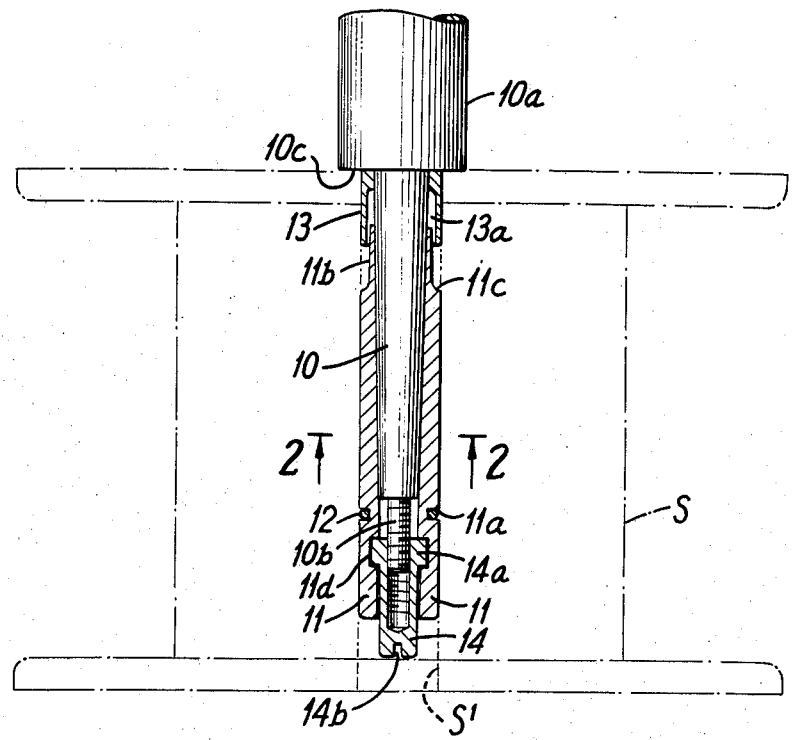

Oct. 26, 1965           E. D. ATKIN           3,214,107

ADJUSTABLE LOCKING MANDREL FOR SPOOLS

Filed July 21, 1964

INVENTOR.
ERIC D. ATKIN

BY
*Davis, Hoxie, Faithfull & Hapgood*
ATTORNEYS.

United States Patent Office 3,214,107
Patented Oct. 26, 1965

3,214,107
ADJUSTABLE LOCKING MANDREL FOR SPOOLS
Eric D. Atkin, Brunswick, Ohio, assignor to Phelps Dodge Copper Products Corporation, New York, N.Y., a corporation of Delaware
Filed July 21, 1964, Ser. No. 384,130
3 Claims. (Cl. 242—46.4)

This invention relates to adjustable mandrels for releasably securing a spool, reel, or the like, to a rotary shaft.

Mandrels for this purpose are mounted on the shaft for rotation therewith and are commonly provided with adjustable means for expanding the mandrel against the wall of the axial bore or hole in the spool, in order to lock the spool to the shaft. However, such devices as made heretofore, so far as I am aware, have not combined all of the desired properties of such devices, particularly simplicity of construction and ease and rapidity of operation to secure the spool firmly to the shaft or release the spool from the shaft.

The principal object of the present invention is to provide an adjustable mandrel of the type described which combines these and other desired properties.

According to the present invention, the rotary shaft has a forwardly tapering end portion located within a split sleeve which has an internal taper complementary to the taper of the shaft end portion. This sleeve is split longitudinally to form a plurality of separate longitudinal segments, the peripheral surfaces of which form a substantially cylindrical profile. These peripheral surfaces are recessed to form a generally annular groove in the sleeve and this groove receives a retainer in the form of an O-ring of spring metal which is cut to form a gap in the ring and thereby permit it to expand and contract. The front end portions of the sleeve segments surround a reduced extension of the smaller end of the tapered portion of the shaft and are recessed internally to form a generally annular recess surrounding this extension. An adjustment member is threaded on the reduced extension within the split sleeve and has an external flange located in the internal annular recess of the sleeve segments. Preferably, a collar is rotatable with the shaft at the rear end of its tapered portion (at the larger end of that portion) and forms with the shaft an annular space opening forwardly toward the smaller end of the tapered portion, the sleeve segments having their rear end portions retained in this annular space.

With this construction, the sleeve segments are held in assembled relation on the tapered end portion of the shaft by the spring action of the O-ring, and the collar surrounding the rear ends of the sleeve segments serves to limit radial displacements of the segments from the shaft while allowing longitudinal movements of the segments along the shaft. When the adjustment member is screwed in one direction on the reduced extension, it moves the sleeve segments rearwardly along the tapered end portion of the shaft so as to expand the sleeve against the wall of the spool bore by a camming action between the tapered end portion of the shaft and the complementary internal taper of the sleeve segments, the O-ring being yieldable to accommodate this expansion. Conversely, when the adjustment member is screwed in the opposite direction, it draws the sleeve segments forwardly so that the O-ring contracts the split sleeve and thereby releases the spool from the mandrel and shaft.

Figure 2:
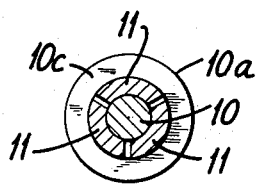

For a better understanding of the invention, reference may be had to the accompanying drawing in which:

FIG. 1 is a longitudinal sectional view of a preferred form of the new mandrel, showing a spool (in outline) secured by the mandrel to a rotary shaft, and FIG. 2 is a cross sectional view on the line 2—2 in FIG. 1, the outline of the spool being omitted.

Referring to the drawing, the reference numeral 10 designates a forwardly tapered end portion of a rotary shaft 10a. At its front or smaller end, the tapered portion 10 has a reduced extension 10b. A plurality of longitudinal segments 11 are mounted on the tapered end portion 10 of the shaft and form a longitudinally split sleeve having an internal taper complementary to the taper of the shaft portion 10. As shown, the split sleeve has three longitudinal segments 11, although the number of these segments may vary. The peripheral surfaces of the sleeve segments 11 form a substantially cylindrical profile corresponding generally to the profile of the axial bore or hole $S^1$ in the spool S.

Near their front ends, the sleeve segments 11 have transverse recesses in their peripheral surfaces, these recesses providing the sleeve with an annular groove 11a which receives an O-ring 12. The ring 12 is made of spring metal and has a gap (not shown) so that the ring can expand and contract. A collar 13 is secured to shaft 10a for rotation therewith and surrounds the rear or larger end portion of the tapered part 10 with a clearance. Thus, the collar 13 forms with the tapered portion 10 an annular recess 13a which opens forwardly toward the small end of tapered portion 10. The annular recess 13a receives the rear end portions 11b of the sleeve segments 11, these end portions being reduced somewhat to form external shoulders 11c.

An adjustment member 14 is threaded on the reduced extension 10b of the shaft and has an external flange 14a received in internal recesses 11d of the sleeve segments. As shown in FIG. 1, the adjustment member 14 projects through the front end of the split sleeve formed by segments 11. The projecting front end of the adjustment member is provided with a slot 14b for receiving a screw driver, whereby the adjustment member may be readily screwed in either direction along the reduced extension 10b.

In the operation of the adjustable mandrel, the spool S is first mounted loosely on the sleeve segments 11 by inserting the front ends of these segments in the spool bore $S^1$ and sliding the spool along these segments until one end of the spool abuts against the shoulder 10c formed by the main section 10a of the shaft. The adjustment member 14 is then screwed rearwardly on the reduced extension 10b so as to slide the sleeve segments 11 rearwardly along the tapered portion 10 of the shaft. As a result, the split sleeve formed by segments 11 expands against the spring action of O-ring 12, due to the camming action between the complementary tapered surfaces of the sleeve segments and the shaft portion 10. This action is continued until the split sleeve is expanded tightly against the wall of the spool bore $S^1$, the rear end portions 11b of the segments sliding farther into the collar 13 as the expanding action progresses. When it is desired to release the spool from shaft 10a, adjustment member 14 is screwed in the opposite direction to move it forward on the reduced extension 10b, thereby drawing the sleeve segments 11 forward along tapered portion 10 of the shaft. During this releasing action, the O-ring 12 contracts so as to maintain the sleeve segments against tapered portion 10 of the shaft and thereby contract the split sleeve. The spool S may then be readily removed from the contracted mandrel.

I claim:

1. In combination with a rotary shaft for spools, and the like, said shaft having a forwardly tapered end portion, an adjustable mandrel comprising a split sleeve slidably mounted on said tapered end portion and having an internal taper complementary to the taper of said end portion, the sleeve being split longitudinally to form a plurality of separate longitudinal segments, the peripheral surfaces of said segments forming a substantially cylindrical profile and being recessed to provide the sleeve with a generally annular external groove, an O-ring of spring material in said groove, the ring being formed with a gap to permit expansion and contraction of the ring, said ring holding the sleeve segments in assembled relation against and around said tapered end portion, the smaller end of said tapered end portion having a reduced extension, the front portion of the split sleeve surrounding said extension with a clearance and having a generally annular internal recess, and a rotatable adjustment member threaded on said extension and having an external flange received in said internal recess, whereby rotation of said adjustment member in one direction slides the sleeve segments rearward along said tapered portion and expands the split sleeve against the spring action of said O-ring.

2. The combination according to claim 1, comprising also a collar rotatable with the shaft at the rear end of said tapered portion and forming with the shaft an annular space opening forwardly toward the smaller end of said tapered end portion, said segments having rear end portions slidable longitudinally in said space.

3. The combination according to claim 1, in which said adjustment member projects forwardly through the front end of the split sleeve, the projecting front end of the adjustment member having a slot for receiving a screw driver.

References Cited by the Examiner
UNITED STATES PATENTS

| | | |
|---|---|---|
| 138,947 | 5/73 | Smith. |
| 712,536 | 11/02 | Hill _____ 242—46.4 X |
| 1,673,878 | 6/28 | Leopold et al. _____ 242—72.1 |
| 1,716,812 | 6/29 | Ball. |
| 1,928,979 | 10/33 | Levison _____ 242—72.1 X |
| 2,297,648 | 9/42 | Cushman _____ 242—72.1 |

MERVIN STEIN, *Primary Examiner.*